United States Patent [19]
Sato

[11] 4,353,157
[45] Oct. 12, 1982

[54] CLIP DRIVER

[76] Inventor: Hisao Sato, 10, Toyotamaminami-3-chome, Nerima-ku, Tokyo, Japan

[21] Appl. No.: 143,505

[22] Filed: Apr. 24, 1980

[30] Foreign Application Priority Data

May 1, 1979 [JP] Japan ............................ 54-58424[U]
Sep. 5, 1979 [JP] Japan ............................ 54-121869[U]
Nov. 9, 1979 [JP] Japan ............................ 54-154806[U]
Dec. 3, 1979 [JP] Japan ............................ 54-167224[U]

[51] Int. Cl.[3] ............................ B23P 11/00
[52] U.S. Cl. ............................ 29/243.56
[58] Field of Search ............................ 29/243.56, 270, 278, 29/814

[56] References Cited

U.S. PATENT DOCUMENTS 2,222,220 11/1940 Binch ............................ 29/243.56
4,182,015 1/1980 Niedecker ............................ 29/243.56
4,261,098 4/1981 Lincoln ............................ 29/243.56

FOREIGN PATENT DOCUMENTS 690435 4/1940 Fed. Rep. of Germany .

*Primary Examiner*—James L. Jones, Jr.
*Attorney, Agent, or Firm*—Norbert P. Holler

[57] ABSTRACT

A clip driver for driving such a type of clip as having opposing holding webs the front edges of which are resiliently pressed to each other to form lips for clipping sheets of paper or the like. The clip driver has a casing in which formed is a longitudinal guide way for guiding the clip, a clip driving member for driving the clip along the guide way and clip opening member with bifurcated inclined leg portions diverging toward the front end of the casing. In use, the clip is driven forwardly by the driving member so that lugs extending laterally from the holding webs slide along the diverging surfaces to forcibly open the clip overcoming the resilient pressing force to permit the sheets of paper or the like to be placed between two holding webs of the clip. As the clip is further driven forwardly, the lugs clear the guide surfaces of the clip opening member to allow the holding webs of the clip to be closed, thereby to clip the sheets of paper or the like.

23 Claims, 22 Drawing Figures

CLIP DRIVER

BACKGROUND OF THE INVENTION The present invention relates to a driver for a new type clip made of a resilient plate member bent and shaped to have two opposing lips for clipping therebetween sheets of paper or the like.

Such a clip for clipping sheets of paper or the like has been known as being made of an integral resilient plate member bent and shaped to have two opposing lips for clipping therebetween the sheets of paper or the like, each lip being curled to form a ring-shaped edge having a circular cross-section. The clip further has a pair of clip opening levers each constituted by a rigid metal wire bent to have opposing legs which are bent at their extremities to form pins inserted into the curled ring-shaped edge of each lip of the clip body. In use, two clip opening levers are turned back and pressed by fingers toward each other to move the two lips away from each other, overcoming the resilient force of the clip body, to receive the sheets of paper or the like therebetween. Then, as the opening levers are relieved from manual force, the lips spring back to firmly clip the sheets therebetween.

This type of clip, however, has a drawback in that the clip opening lever inconveniently obstructs the handling of the papers. In addition, it is difficult for the persons of small finger force such as ladies and children to open the clip by overcoming the strong resilient force of the clip body.

Under these circumstances, the applicant has already proposed in a copending application No. 147,714 filed Apr. 21, 1980, a novel clip made of an integral resilient plate member bent and shaped to have opposing lips which are resiliently pressed against each other, the lips having clip-opening lugs projecting laterally from at least one side thereof. Since this clip does not require clip opening levers which have been indispensable in the prior clip, it does not cause problems in the handling of sheets. This novel clip, however, requires a special driver for opening the clip and driving the same toward the papers.

SUMMARY OF THE INVENTION

It is, therefore, an object of the invention to provide a clip driver capable of driving this novel clip toward the clipping position while keeping the same in the opened state.

It is another object of the invention to provide a clip driver which is adapted to be charged with a plurality of clips and capable of feeding the clips one by one in the opened state by repeated manipulation of a driving member or a handle to clip the papers or the like.

To these ends, according to the invention, there is provided a clip driver for attaching a clip to sheets of paper or the like, the clip having a pair of opposing generally flat holding webs the front ends of which are resiliently pressed against each other to form lips for clipping the sheets therebetween and at least one pair of opposing lugs, each laterally projecting from one of side edges of each said holding web, said clip driver comprising: a casing; a guide way formed in the casing to extend longitudinally therethrough; an inlet for charging said clip into the rear end of the guide way in such a manner that said lips of said clip are directed toward the front end of said guide way; an outlet provided in the front end of said guide way for delivering said clip; and clip opening means disposed on at least one side of said guide way near the front end of the latter and having opposite guide surfaces gradually diverging toward said outlet, said pair of lugs of said clip being adapted to make sliding engagement with said guide surfaces, respectively, to open said clip during the forward movement of said clip along said guide way.

The opening means may be constituted by a member shaped like a tuning fork having a flat rear end portion and two inclined leg portions bifurcated from the flat rear end portion, and is preferably made of a resilient member.

The clip driver of the invention can have a driving member or a handle for driving the clip along the guide way and beyond the opening means. The guide way can accomodate a plurality of clips so that the clips are delivered one by one successively by repeated manipulation of the driving member or the handle.

These and other objects, as well as advantageous features of the invention will become clear from the following description of the preferred embodiments taken in conjunction with the accompanying drawings. dr

BRIEF DESCRIPTION OF THE DRAWINGS

FIG. 9 is a perspective view of the clip in the state clipping sheets of paper or the like;

DESCRIPTION OF THE PREFERRED EMBODIMENTS

Figure 1:
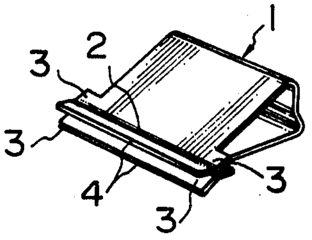
FIG. 1 is a perspective view of a novel clip which is charged in and handled by the clip driver of the invention.
Figure 2:
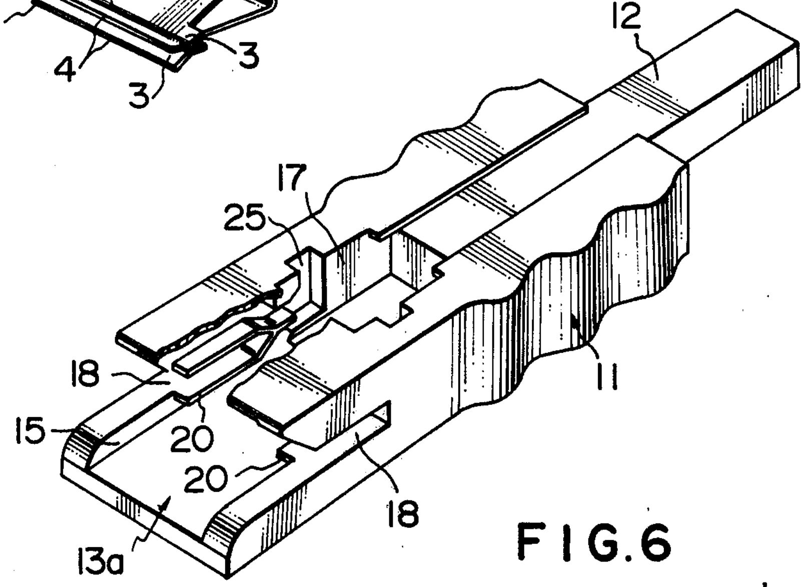
FIG. 2 is a partly cut-away perspective view of a first embodiment of the invention.

FIG. 1 shows a novel clip which is adapted to be driven by a clip driver of the present invention. The clip is made of a sheet of a resilient material such as metal, plastic or the like, bent and shaped to have generally flat holding webs the front ends of which are resiliently pressed against each other to form lips 2 which cooperate with each other in clipping therebetween sheets of paper or the like. Both holding webs are provided at both side edges with lugs extending laterally therefrom. In the clip shown in FIG. 1, the lugs 3 are provided near the extremities 4 of the holding webs and the extremities 4 are slightly bent outwardly. The lugs 3, however, can be provided at any portions of the side edges of the holding webs. It is also possible to provide the lugs 3 only at one side of the opposing holding webs.

Hereinafter, a clip driver of a first embodiment of the invention for driving the above-mentioned clip will be described with specific reference to FIGS. 2 to 5.

The clip driver of the invention has a casing 11 made of a plastic or a metal in which formed is a central longitudinal groove constituting a guide way 13 along which the clip is driven. A driving member 12 made of a plastic or a metal is inserted into the guide way 13 from the rear end (right-side end as viewed in FIGS. 2 to 4) of the latter for a free reciprocating and sliding movement. A clip charging port 17 is formed in the casing 11 to communicate with substantially central portion of the guide way 13 and to open in the upper wall of the casing 11. Thus, the portion of the guide way between the clip charging port 17 and the rear end of the casing 11 is a rear guide way 13*b* for the driving member 12 solely, whereas the portion extending forwardly from the clip charging port 17 constitutes a clip guide way 13*a* along which the clip 1 slides as it is driven by the clip driving member 12. The casing 11 has a symmetrical construction with respect to the axis of symmetry which coincides with the longitudinal axis thereof. The clip guide way 13*a* is defined by a bottom wall 14, side walls 15 and a top wall 16. A slot 18 for receiving and positioning the sheets of paper or the like is formed at the front end of each side wall 15.

A clip opening member 20 having a form like a tuning fork, having two inclined leg portions bifurcated from the rear end portion thereof, is provided at the inside of each side wall 15. The clip opening members 20 constitute clip opening means of the clip driver of the invention. The clip opening member 20 may be formed integrally with the side wall 15 or may be formed separately from the casing and attached to the side wall 15 by a suitable measure. More specifically, the clip opening member is constituted by a flat end portion 21, inclined leg portions 23 bifurcated from a point 22 ahead of the flat rear end 21 and flat front end portions 24 extended forwardly from inclined leg portions 23 and in parallel with each other. As will be seen from FIGS. 2 to 5, the distance between two flat front end portions 24 of each clip opening member is equal to the distance between both walls defining the front sheet-receiving slot 18, and the flat front end portions 24 of both side walls are aligned with each other in the breadthwise direction of the casing 11. The rear ends of the upper and lower flat front end portions of each clip opening member 20 is flush with the rear end of the slot 18 in the longitudinal direction of the casing 11. The flat front end portion 24 of the clip opening member 20 may be omitted, if the bifurcated leg portions 23 are arranged to receive the edges of the sheets of paper or the like therebetween. In such a case, the inclined leg portion 23 has a long rectilinear or curvilinear form. The clip opening member 20 may be constructed such that the distance between both bifurcated portions is greater than the distance between upper and lower walls of the sheet receiving slot 18. The front edge of each flat front end portion 24 should be located such that the sheets of paper or the like are received by the space between the upper and lower flat front end portions 24. In other words, the flat front end portions 24 should at least partially overlap the sheet receiving slot 18 in the longitudinal direction. It is, however, desirable that the bifurcated point 22 is slightly spaced apart rearwardly from the rear end of the sheet receiving slot 18. The clip opening members 20 has a uniform width over its entire length from the front end to rear end thereof. This width is selected to be greater than the projecting length of each lug 3. Grooves 25 for guiding the lugs 3 are formed at both sides of the clip charging port 17 for communication with the clip guide way 13*a*. The lateral width and height of the clip guide way 13*a* are selected to permit the passage of the lugs 3 which constitute the maximum breadth of the clip 1, whereas the distance between the left and right clip opening members 20, as well as the height of the same, is selected to permit the body portion of the clip excepting the lugs 3 to pass therethrough.

Figure 4:
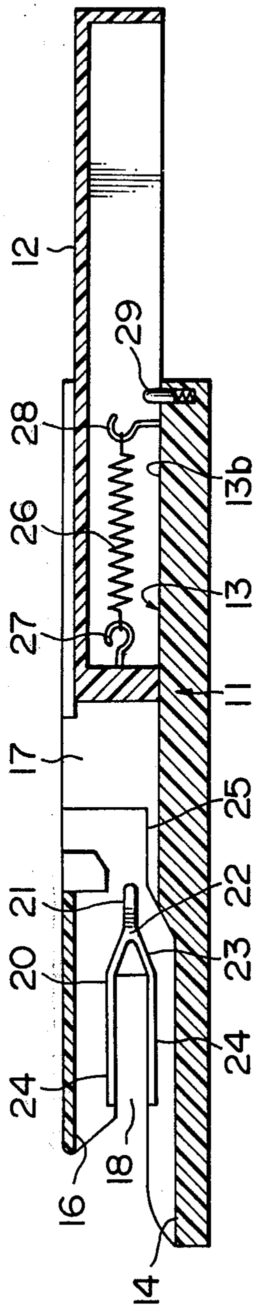
FIG. 4 is a longitudinal sectional view of the first embodiment of the invention.

As will be clearly understood from FIG. 4, the driving member 12 has a form of a hollow rod opened at the lower face thereof. A tension spring 26 is stretched between a spring retainer 27 formed on the inner surface of the front end portion of the clip driving member 12 and the spring retainer 28 formed at the rear end portion of the guide way 13. A stopper 29 is provided for preventing the clip driving member 12 from projecting out of the guide way 13. The clip driving member 12 is normally pulled rearward by the force of the tension spring 26 so that the front end of the driving member 12 is positioned at the rear side of the clip charging port 17.

The clip driver of the first embodiment having the construction heretofore described operates in a manner explained hereinunder.

Figure 6:
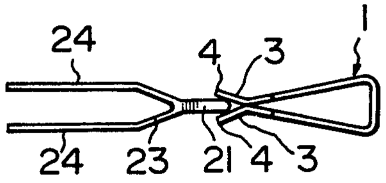
FIG. 6 is a sectional view of the clip with its front end contacting the rear end of the opening means.
Figure 5:
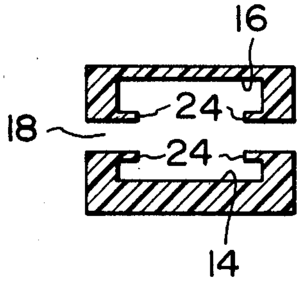
FIG. 5 is a sectional view taken along the line V—V of FIG. 3.
Figure 7:
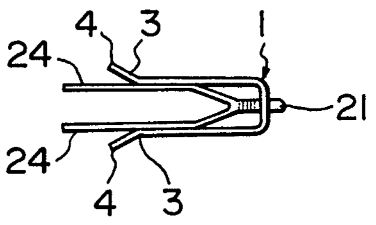
FIG. 7 is a sectional view of the clip in the state opened by the opening means.
Figure 3:
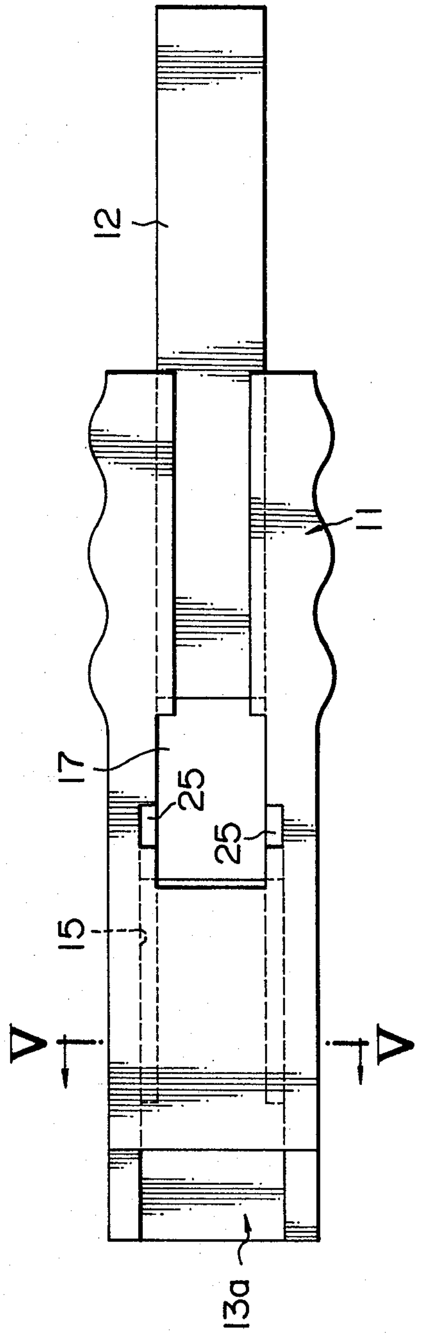
FIG. 3 is a plan view of the first embodiment of the invention.
Figure 8:
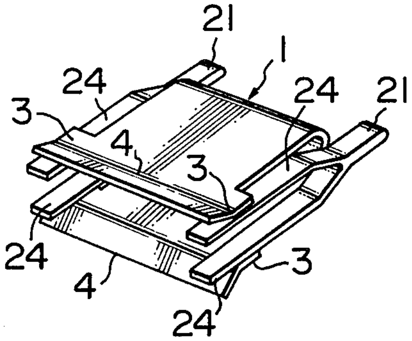
FIG. 8 is a perspective view of the clip in the state opened by the opening means.
Figure 9:
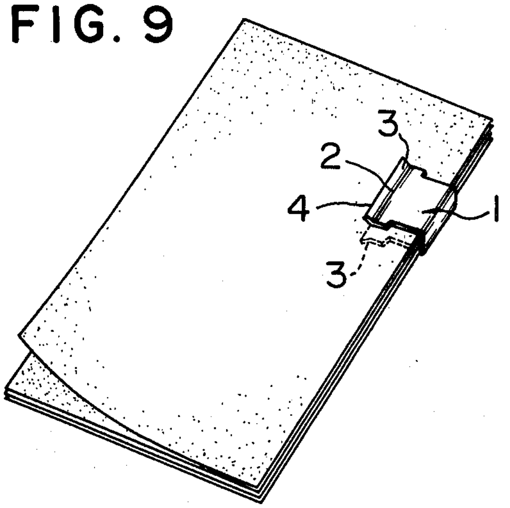

For clipping the sheets such as papers with the clip 1, the clip 1 is charged into the clip guide way 13*a* through the clip charging port 17, and the edge portions of the sheets to be clipped is placed in the sheet receiving slots 18. Then, the clip driving member 12 is pushed forwardly by a finger to drive the clip 1 forwardly along the clip guide way 13*a* to bring the front ends of the lugs 3 into contact with the rear ends of the clip opening members 20 as shown in FIG. 6. As the clip 1 is further driven forwardly, the upper and lower lugs 3 at each side of the clip come to receive therebetween the rear end of the flat end portion 21 of the corresponding clip opening member so that the clip is partly opened. Then, as the clip driving member is pushed further forwardly, the clip is moved ahead with its upper and lower lugs at each side thereof in sliding engagement with the upper and lower sliding surfaces presented by the inclined leg portions 23 of each clip opening member 20 so that the clip is gradually opened due to a wedging action. The clip 1 in the opened state is then slided along the outer surfaces of the flat front end portions 24 of the clip opening members 20 as shown in FIGS. 7 and 8. Since the sheets of paper or the like received by the sheet receiving slots 18 is positioned in the space between the flat front end portions 24 of the clip opening members 20, the holding webs of the clip 1 are ready for clipping these sheets therebetween. Then, as the clip 1 is moved ahead further by a further pushing of the clip driving member, the lugs 3 of the clip are moved beyond the front edges of the clip opening members and disengaged from the latter to permit the upper and lower holding webs to be reset due to their resiliency thereby to clip the sheets therebetween. FIG. 9 shows the sheets of paper or the like after clipping by the clip 1 and withdrawal from the slots 18 of the clip driver.

According to this embodiment of the invention, only a small manual force is required for pushing the clip driving member 12, because the clip 1 is gradually opened due to a wedging action performed by the inclined leg portions 23 of the clip opening member 20. Thus, the clip driver of this invention can easily be handled even by those who have small finger force such as ladies and children. In addition, the clip 1 having no clip opening levers does not obstruct the handling of the sheets at all. The clip 1 made of a resilient plate-shaped material exhibits a strong clipping force and finds a wide use.

In the described first embodiment, the sheet receiving slots 18 are provided for protecting the clip opening members and for imparting a good appearance to the clip driver. Thus, the provision of the sheet receiving slots are not essential, and the clipping function is still present even when the sheet receiving slots are omitted.

It is also possible to remove the top wall of the clip guide way 13*a* so that a finger may be inserted into the clip guide way 13*a* to directly push and drive the clip 1. In this case, the driving member 12 can be dispensed with.

Hereinafter, a second embodiment of the invention will be described with specific reference to FIGS. 10 to 14. A casing 111 made of a plastic or a metal has a form symmetrical with respect to the longitudinal axis and is provided with a longitudinal central clip guide way 113 formed therein. Clip guide grooves 130 are formed at both sides of the rear portion (right-side portion as viewed in FIGS. 10 and 13) of the clip guide way so as to receive and guide the lugs 3 of the clip 1. The side surfaces of the clip 1 excepting the lugs 3 make sliding engagement with the upper and lower portions 131 and 132 of the side walls of the guide way 13*a* above and below the guide grooves 130. The inner surfaces of the side walls 133 of the clip guide way 113 in the front portion thereof are flush with the bottoms of the clip guide grooves 130. In other words, the distance between the inner surfaces of the left and right side walls 133 is equal to the distance between the bottoms of the left and right guide grooves 130. The upper wall of the clip guide way 113 is provided only at the front portion of the latter so that it is possible to push and drive the clip directly by a finger inserted into the guide way 113. The upper part 131 of each side wall is notched at its rear end portion to facilitate the insertion of the clips into the clip guide way 113. A sheet receiving slot 134 opened in the front end thereof is formed in each side wall of front part of the casing 111. Also, each side wall is provided with a shaft bore 136 to communicate with the narrow flat rear end portion 135 of each sheet receiving slot 134.

Each clip opening member 120 is fabricated from a resilient plate-like material bent and shaped to have bifurcated inclined leg portions. Alternatively, the clip opening member 120 may be formed of two web-like resilient members join to each other at their rear end. The clip opening member 120 shown in FIG. 11 has two pairs of upper and lower inclined leg portions, the two upper inclined leg portions being connected at their front ends to each other by means of a transverse connecting web. The two lower inclined leg portions are connected at their front ends to each other also by means of a transverse connecting web. More specifically, a resilient plate-like member is bent at an intermediate portion to form a rear end joint portion 140 (right end portion as viewed in FIGS. 11 and 12) from which extended forwardly is a rear flat portion 121 where two plate-like members are superposed with respect to each other. The front end of each flat rear end portion is bifurcated into an upper and a lower inclined leg portions 123. The front end of the right upper inclined leg portion is unitarily connected to that of the left upper inclined leg portion by means of the connecting web 124. Similarly, the front end of the right lower inclined leg portion is connected to that of the left lower inclined leg portion by means of the connecting web 124. The front end portion of each inclined leg portion at each side of the clip opening member 120 is notched as at 141. A pin receiving bore 142 is formed in each flat rear end portion 121 for receiving a pin 143 to fix the clip opening member 120 to the casing 111. In the clip opening member 120 shown in FIGS. 11 and 12, the inclination angle of the inclined leg portion is gradually changed along its length and is curved outwardly at its front extremity to provide a diverging front end portion of the clip opening member. The degree of divergence of the front extremity, as well as the degree of inclination of the leg portion can be selected as desired.

Figure 10:
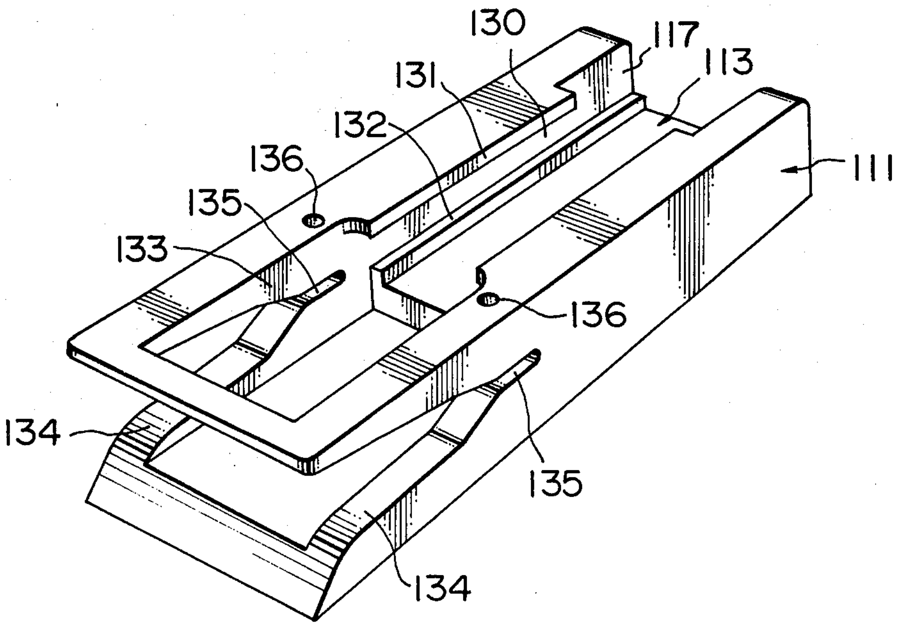
FIG. 10 is a perspective view of the body of a clip driver constructed in accordance with a second embodiment of the invention.
Figure 11:
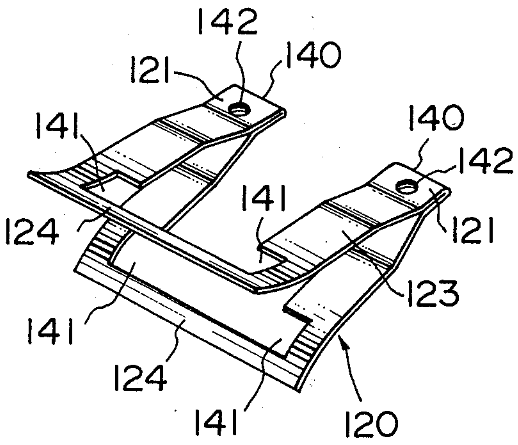
FIG. 11 is a perspective view of the opening member incorporated in the second embodiment.
Figure 12:
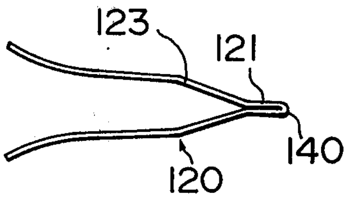
FIG. 12 is a side elevational view of the opening means incorporated in the second embodiment.
Figure 13:
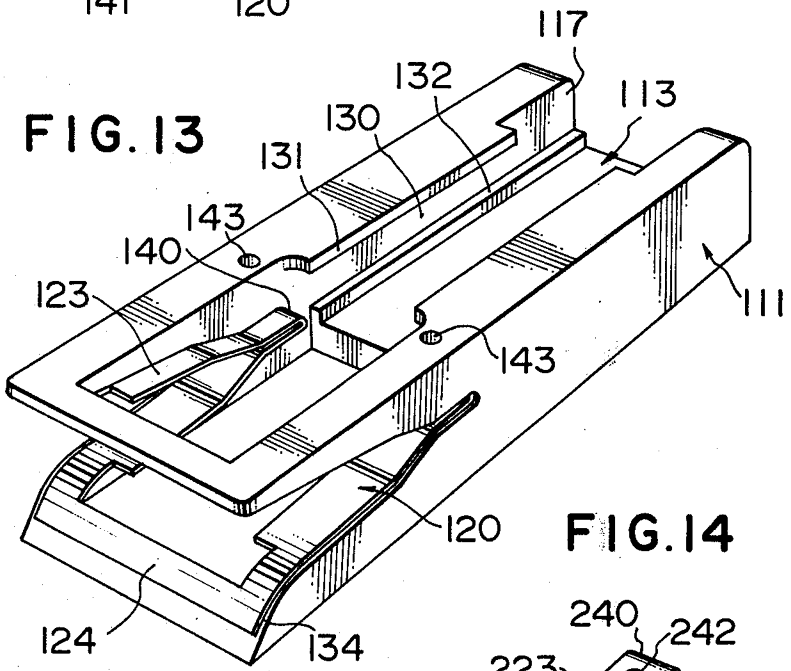
FIG. 13 is a perspective view of the second embodiment of the invention.

FIG. 13 shows the clip driver of the second embodiment with the clip opening member 120 fitted in the slot 134 (See FIG. 10). More specifically, each flat rear end portion 121 of the clip opening member is fitted to the flat rear end portion 135 of each slot 134 such that the pin receiving bores 142 of the clip opening member 120 are aligned with pin insertion bores 136 of the casing 111, and pins 143 are inserted into these bores to fix the clip opening member 120 to the casing 111. The use of fixing pins 143, however, is not exclusive and the fixing construction can be modified as desired. For instance, the fixing may be made by means of an adhesive.

The distance between the outer edges of the clip opening member 120 is equal to the width of the casing 111, i.e. to the distance between outer side edges of the slots 134. The width of each inclined leg portion 123 of the clip opening member 120 at the portion thereof where the notch 141 is formed equals to the thickness of the side wall 133 formed with the slot 134, so that the flat rear end portion 121 and the inclined leg portion 123 project toward the inside from each side wall 133 having the slot 134 by an amount equal to the width of the notch 141.

The operation and effect derived from the second embodiment are as follows.

One or more clips 1 are charged into the clip guide way 113 with the clipping end thereof directed forwardly so that the lugs 3 of the clip 1 engage the guide grooves 130. Then, the sheets of paper or the like are placed between the upper and lower inclined leg portions of the clip opening member 120, and the clip 1 is driven forwardly. This driving may be made directly by a finger inserted into the clip guide way 113 from the top of the casing 111 or may be made by means of a clip driving member similar to that used in the first embodiment.

The clip 1 is gradually opened as it is driven forwardly making engagement with the clip opening member 120 to clip the sheets as in the first embodiment. This second embodiment, however, differs from the first embodiment in that the clip opening member 120 has a resiliency and the right and left clip opening member segments are connected to each other at their upper and lower front ends by means of connecting webs 123. Namely, in the described second embodiment, the resilient upper and lower inclined leg portions 123 of the clip opening member 120 are urged toward each other during the passage of the lugs 3 of the clip 1 along these leg portions. The amount of closing of the inclined leg portions 123 depends on the resiliencies of the clip opening member 123 and the clip 1. It is, however, preferred that the resilient upper and lower inclined leg portions are urged until their inner surfaces come into contact with the sheets to be clipped. This is because the inclination of the resilient leg portions 123 is reduced by such an urging thereby to reduce the amount of opening of the clip 1 and, hence, the force required for driving the clip 1. As the clip 1 is moved to such a position that the lugs 3 thereof come to the notches 141 of the clip opening member 120, the clip 1 is disengaged from the clip opening member 120 generating a snapping sound to permit the clip opening member 120 to resume the original opened state, while the clip 1 is delivered to the sheets to clip the latter. FIG. 9 shows the sheets after clipped by the clip 1 and withdrawal from the clip opening member 120.

Figure 14:
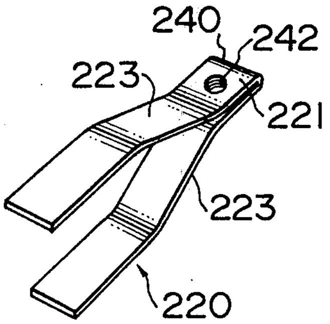
FIG. 14 is a perspective view of a modification of the opening means incorporated in the second embodiment.
Figure 15:
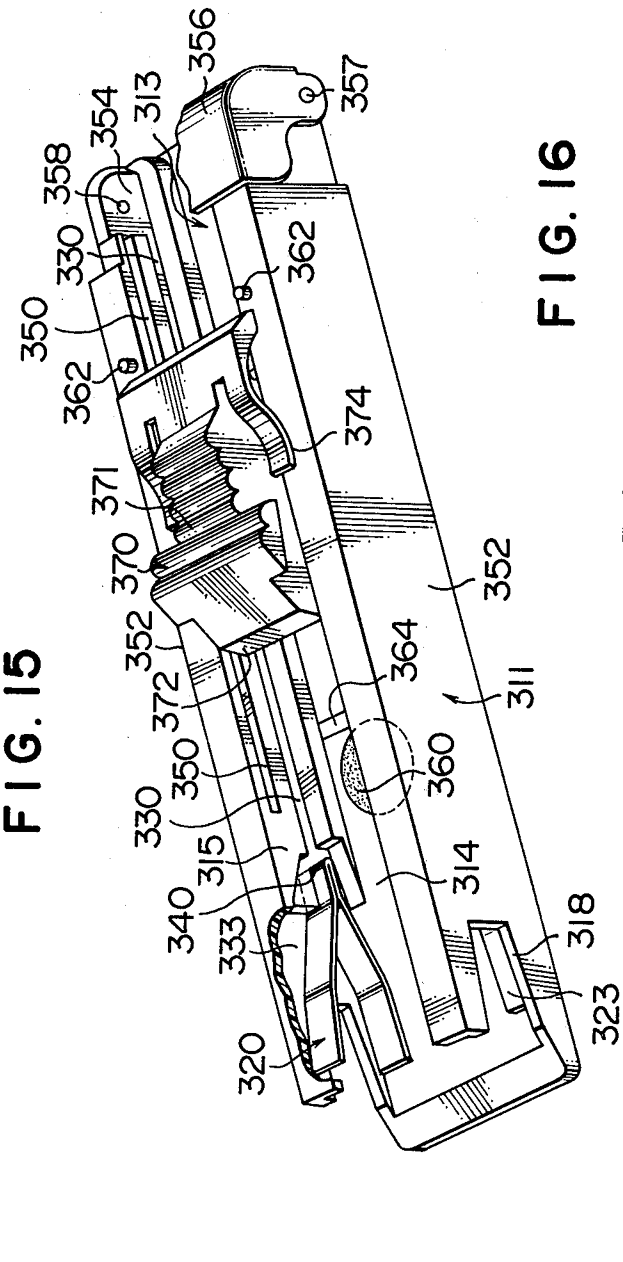
FIG. 15 is a partly cut-away perspective view of a third embodiment of the invention.
Figure 16:
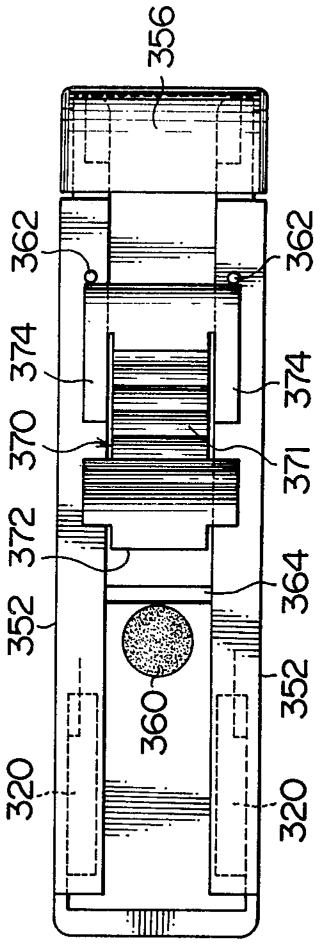
FIG. 16 is a plan view of the third embodiment of the invention.
Figure 17:
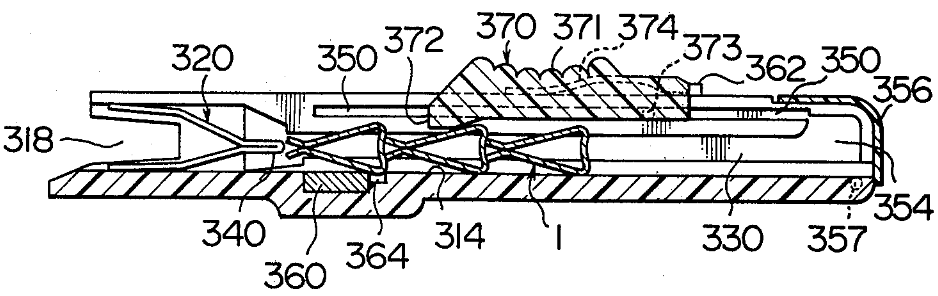
FIG. 17 is a longitudinal sectional view of the third embodiment of the invention.
Figure 18:
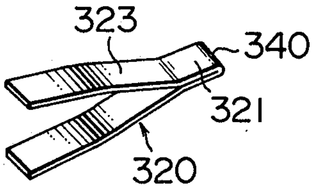
FIG. 18 is a perspective view of the opening means incorporated in the third embodiment of the invention.
Figure 19:
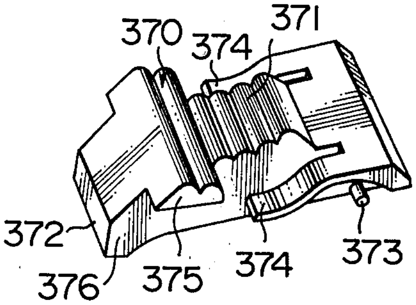
FIG. 19 is a perspective view of a driving member incorporated in the third embodiment of the invention.
Figure 20:
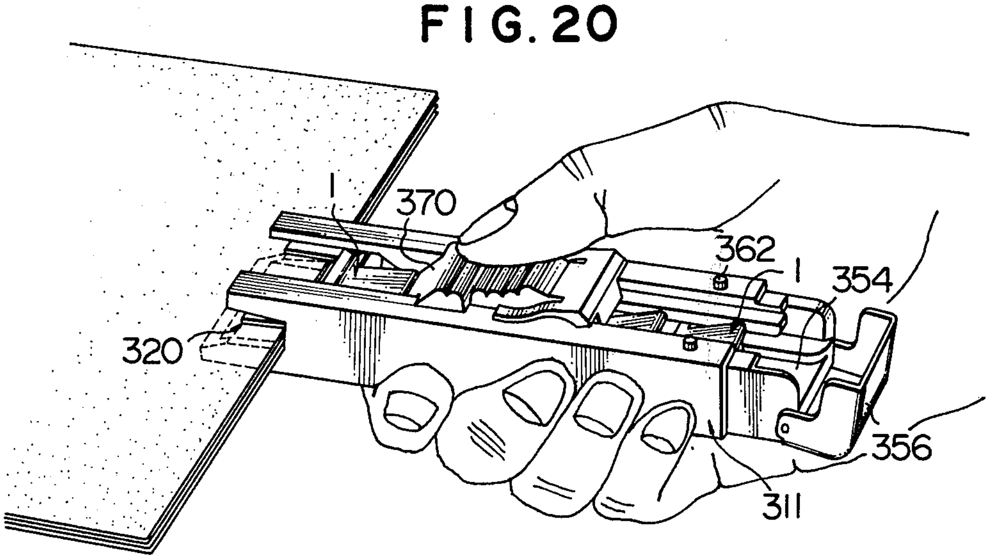
FIG. 20 is a perspective view of the third embodiment of the invention in the state of use.

FIG. 14 shows a clip opening member 220 which may be considered as a modification of that of the second embodiment. This clip opening member is formed of a flat web-like resilient member bent at an intermediate portion to form a rear end joint portion 240, as well as a rear flat portion 221 and an upper and lower inclined leg portions 223. A pin receiving bore 242 is formed in the flat rear portion 221. Needless to say, the clip opening member 220 may be formed of two independent web-like resilient member superposed and jointed to each other at the flat rear portion 221. This clip opening member 220 has no connecting web nor the notch and is fitted to the slot 134 at each side of the casing. The way of fitting is substantially identical to that of the second embodiment. Since the clip opening member 220 has a resiliency, the inclined leg portions 223 are urged toward each other during the passage of the clip 1 as in the case of the second embodiment, and are reset to the original positions generating a snapping sound due to their resiliency, while permitting the clip 1 to clip the sheets of paper or the like.

Hereinafter, a third embodiment of the invention will be described with specific reference to FIGS. 15 to 20. The casing 311 of the clip driver of the third embodiment is made of a plastic or a non-magnetic metal. The casing 311 is provided with a central longitudinal clip guide way 313 extending through the entire length thereof. A clip guide groove 330 and a driver guide groove 350 are formed in the inner side surface 315 of each side wall 352 defining the guide way 313. The clip guide groove 330 extends between the rear end of the casing 311 (right-side end as viewed in Figures) where a clip charging section 354 is formed and a front side wall 333 at each side of the casing. The rear end of the driver guide groove 350 formed above the clip guide groove 330 is opened in the rear end surface of the casing 311, while the front end of the same is closed at a position in the vicinity of the front side wall 333 of the casing 311. Each side wall 333 of the casing 311 is provided at its front end with a slot 318 for receiving the sheets to be clipped. A clip opening member 320 is fitted to the inside of each slot 318. A permanent magnet 360 is embedded in the bottom 314 of the clip guide way 313 at a portion of the latter just behind the clip opening members 320. The permanent magnet 360 is adapted to magnetically attract and hold stationary the clip 1 which is closest to the clip opening members 320, i.e. the clip prepared for the driving, one of a plurality of clips accomodated by the clip guide way 313. A stop groove 364 is formed at a portion of the bottom 314 behind the permanent magnet 360 and adapted to be in engagement with the rear edge of the lower holding web of the clip 1 to prevent the clip 1 from moving rearward.

Pin bores 358 are formed in the rear end portions of side walls 352 of the casing 311. A rear cover having pin bores are swingably attached to the rear end of the casing 311 by means of pins 357 which are inserted into the pin bores of the side walls and the rear cover at respective sides of the casing 311, so as to be moved to open and close the rear end of the clip guide way 313. The clip opening member 320 may have the same construction as the clip opening member 220 of the second embodiment. Namely, the clip opening member may be formed of a resilient web-like member bent and shaped to have a rear end joint portion 340 at which the blank material is bent, a rear flat portion 321 and bifurcated inclined leg portions 323. The inclination angle or gradient of each inclined leg portion may be varied along the length of the inclined leg portion. Alternatively, the inclined leg portion 323 may have a continuous curvilinear form. The clip opening members 320 are fitted to respective slots 318 of the side walls 333 with their bifurcated portions directed forwardly, and are fixed to the inside of these slots by means of pins or an adhesive as in the case of the second embodiment.

A clip driving member 370 is made of a resilient material such as a plastic and has a form symmetrical with respect to the longitudinal axis thereof. The side surfaces 376 of the clip driving member 370 are smoothed to make a reciprocal sliding engagement with the inside surface 315 of the side walls 352 of the clip guide way 313 of the casing. The front end surface 372 of the clip driving member 370 constitutes a clip driving surface. Lugs 373 are attached to the rear end portions of both side surfaces 376 of the clip driving member 370 and are adapted to be slidably received by the aforementioned drive guide grooves 350 of the casing 311. The rear portion of the top of the clip driving member 370 is projected laterally at each side of the latter and then extended forwardly to form a spring tab 374. These spring tabs 374 exert resilient force to raise the front end surface 372 of the clip driving member to prevent the same from contacting the clip accomodated by the clip guide way 313. Further, the clip driving member 370 is provided with a finger retaining portion 371 formed on its top surface. Also, lateral projections 375 are formed on the front end portion of the clip driving member 376 to extend laterally from the side surfaces 376 so as to restrict the clip driving member 370 from moving downward, thereby to optimize the contact between the front end surface 372 of the clip driving member 370 and the rear end of the clip 1 to drive the clip without fail when a manual driving force is exerted on the finger retaining portion 371.

The rear end of the driver guide groove 350 is exposed as the rear cover 356 is moved to the opening position so that the clip driving member 370 is inserted into the guide way 313 with their lugs 373 slidably received by the guide grooves 350. The spring tabs 374 of the clip driving member 370 resiliently act on the top surfaces of the side walls 352, so that the front end surface 372 of the clip driving member 370 is biased upward to clear the clip in the guide way 313. Projections 362 are formed on the top surfaces of the side walls 352 of the casing 311 to prevent the rearward movement of the clip driving member 370 and, hence, to prevent the lugs 373 of the clip driving member 370 from being disengaged from corresponding driver guide grooves 350. The projections 362 may be fitted after the insertion of the clip driving member to the casing 311. However, the resiliency of the clip driving member 370 permits the driving member 370 to be deflected to clear the projections 362. It is, therefore, possible to insert the clip driving member 370 after the fitting of the projections 362. The clip guide way is also opened at its rear end as the rear cover 356 is swung to the opening position to permit the charging of the clips. A plurality of clips are stored in the guide way as the rear cover 356 is moved to the closing position. Thus, the clip guide way 313 in this case has a function of a clip magazine.

The clip driver of the third embodiment heretofore described operates in a manner explained hereinunder.

After charging with the clips, the casing 311 is slightly inclined such that its front end is lowered, so that the clips slide forwardly along the guide way due to the force of gravity and the clip closest to the clip opening members 320 is attracted by the permanent magnet 360. The clip attracted by the permanent magnet can never be slided rearwardly, even if the casing 311 is inclined to lower its rear end, and is always held at the driving stand-by position.

Then, after placing the sheets of paper or the like to be clipped in the slots 318, the clip driving member 370 is moved by finger to a position where the front end surface 372 of the clip driving member 370 takes a position somewhat behind the clip in the stand-by position. Subsequently, a finger force is exerted on the finger retaining portion 371 of the clip driving member 370 to depress the latter first and then push the same ahead, as will be seen from FIGS. 17 and 20. In consequence, the front end surface 372 of the clip driving member is brought into contact with the rear end of the clip in the stand-by position thereby to drive the same forwardly. As a result, the clip is opened by the clip opening members 320 in the same manner as that of the modification of the second embodiment, and then closed to clip the sheets received by the slots 318. The sheets after clipping and withdrawal from the slots 318 are shown in FIG. 9. The second clip is moved to the stand-by position by the force of gravity if the front part of the casing is declined. If the second clip is not moved by gravity, it can be advanced to the stand-by position by a finger or the clip driving member 370. The clip held in the stand-by position is never moved back by external force, owing to the cooperation of the magnetic attracting force exerted by the permanent magnet 360 and the stopping groove 364 which engages and retains the rear end of the clip.

A first characteristic feature of this third embodiment resides in that the clip guide way 313 has a large length as compared with those of the first and second embodiments and is provided with the rear cover 356 so as to play also the role of a clip magazine. The second feature resides in the fitting of the clip driver to the casing to ensure a safe and easy driving of the clip. Thanks to these features, the clip driver of the third embodiment has an enhanced utility.

Figure 21:
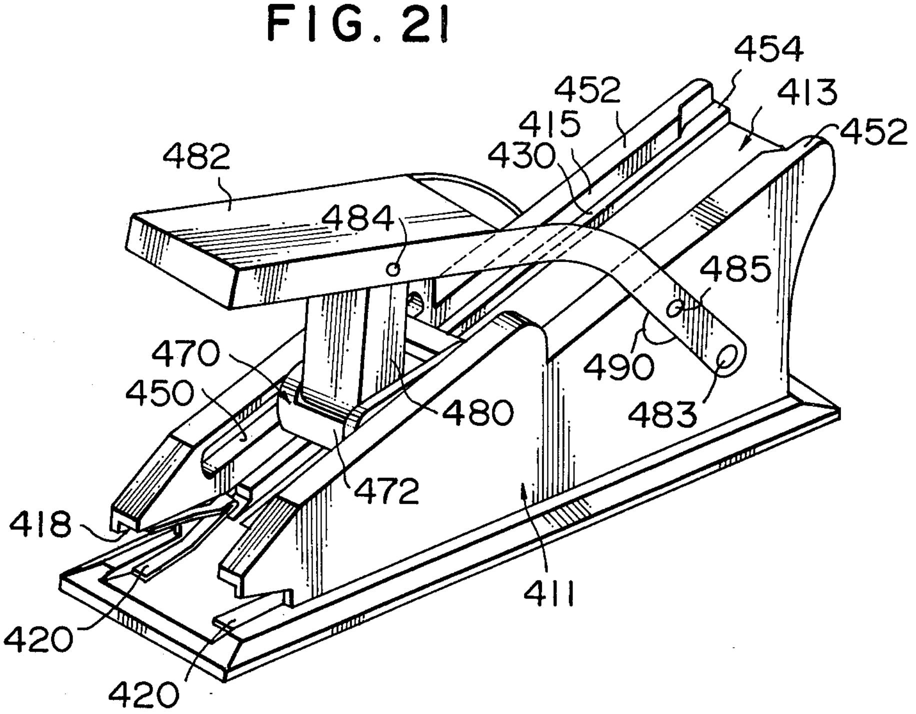
FIG. 21 is a perspective view of a fourth embodiment of the invention.
Figure 22:
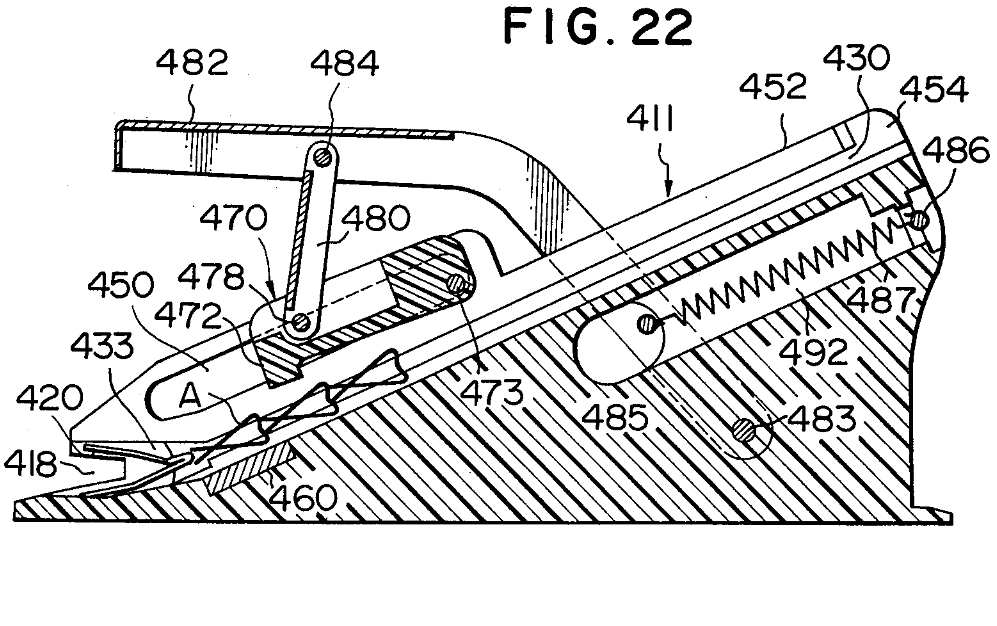
FIG. 22 is a longitudinal sectional view of the fourth embodiment of the invention.

Finally, a fourth embodiment of the invention will be described with specific reference to FIGS. 21 and 22.

A casing 411 of this clip driver has a flat bottom surface and is provided with a clip guide way 413 along the upper surface thereof which is declined downwardly and toward the front end (leftward as viewed in Figures). The casing 411 has an axis of symmetry coinciding with the longitudinal axis thereof. The guide way 413 is defined by both side walls 452 in the inner surfaces 415 of which formed are clip guide grooves 430 which communicate at their rear ends with a clip charging section 454 and at their front ends with a space defined between front side walls 433. Driver guide grooves 450 are formed in the front portions of both side faces 415 of the guide way. These driver guide grooves 450 are located above the clip guide grooves 430. A sheet receiving slot 418 is formed at the front end of each side wall 452 of the casing 411, each of which receives a clip opening member 420 which may be similar to those 320 of the third embodiment but has a form of the inclined leg portion slightly changed from that of the latter.

The angle of inclination of the clip guide way 413 is selected to be large enough to cause a natural sliding movement of the clip in the clip guide way 413 due to the force of gravity. This angle, therefore, depends on the friction coefficient between the clip and the clip guide way 413. The first clip of the clip train is stopped at a stand-by position making a contact with the clip opening member 420. If desired, a permanent magnet 460 may be embedded under the clip in the stand-by position.

A clip driving member 470 has a form symmetrical with respect to its longitudinal axis and is provided with flat side surfaces. The width of the clip driving member 470 is selected suitably for a sliding engagement with the inner surfaces of the side walls 452. Supporting lugs 473 are fixed to the rear end portion of the side surfaces of the clip driving member 470 for making sliding engagement with the driver guide grooves 450 to guide the clip driving member 470 along the grooves 450 as well as to permit the clip driving member 470 to swing about the lugs 473.

A lever 480 is pivotally secured at its lower end to the front end portion of the clip driving member 470 by means of pins 478, while the upper end of the lever 480 is pivotally connected to a handle 482 by means of pins 484. The handle 482 has a form symmetrical with respect to its longitudinal axis and is constituted by a front joint portion and a rear end portion having two legs laterally spaced from each other and saddling over the outsides of the side walls 452. The handle 482 is pivotally secured to a rear end portion of the casing 411 by means of pins 483. In order to limit the angle of rotation of the handle 482 to a range required for driving the clip, a pin 485 is inserted into a transverse bore 490 formed at a suitable portion of the casing 411 and fixed at its both ends to the legs of the handle 482. The casing 411 is provided at its rear portio also with a longitudinal bore 492 which reaches at its front end the transverse bore 490 and a tension spring 487 received by the longitudinal bore 492 is retained at its front end by the pin 485 and at its rear end by a retainer 486 provided at the rear end of the longitudinal bore 492. The handle 482 is thus raised to the illustrated position. The handle 482, lever 480 and the clip driving member 470 are connected such that the clip driving member 470 is moved ahead along the driver guide groove 450 and, at the same time, the front end portion of the driving member 470 is rotated downward around the lugs 473 to bring the front end surface 472 of the clip driving member 470 into contact with the rear end of the clip in the stand-by position to drive the latter forwardly, when the handle 482 is depressed downward.

The fourth embodiment of the invention having the construction described heretofore operates in a manner explained below.

The clip driver casing 411 is placed on a desk or the like and the clip guide way 413 is charged with clips through the clip charging section 454. The clips are successively fed forward by the force of gravity and are stored in the guide way 413. Subsequently, after placing the sheets or the like in the sheet receiving slots 418, the handle 482 is depressed by hand downwardly, so that the latter is rotated around the pin 483 overcoming the force of the tension spring 487 to depress the lever 480 and, hence, the clip driving member 470 to bring the front end surface 472 of the clip driving member 470 into contact with the rear end of the clip in the stand-by position. A further depression of the handle 482 drives the clip into engagement with the clip opening members 420. Then, the opening of the clip and the clipping of sheets with the clip are performed in the same manner as the third embodiment.

This fourth embodiment offers advantages that a considerably large driving force is obtained partly because the depression type actuating mechanism using a handle permits the user to exert a large force and partly because the handle makes a lever action to amplify the force. Thus, this embodiment can suitably used for driving clips having a large spring force.

From the foregoing description, it will be clear that the clip driver of each embodiment makes it possible to clip sheets of paper or the like with the aforementioned novel type of clip. The clip driver of each embodiment requires only a small manual force so that it can be handled easily even by ladies and children. The novel type clip has such a simplified construction that parts other than those required for clipping the sheets are all eliminated, so that it never hinders the handling of the sheets such as turning over or folding of leaves.

To detach the clip, the clip is simply slided rightward as viewed in FIG. 9 out of engagement with the sheets to release the latter.

In the first to fourth embodiments heretofore described, the upper and lower inclined leg portions of the clip opening member are disposed at each side of the clip guide way. This, however, is not exclusive, and a similar effect can be obtained even when these inclined leg portions are disposed only at one side of the clip guide way. Rather, when the clip to be handled is provided with lugs only at its one side, it may be preferable that the clip driver is provided with the clip opening member only at one side of the clip guide way.

Although the invention has been described through four different embodiments, it will be clear to those skilled in the art that these embodiments may be modified independently or combined with each other as desired, without departing from the scope of the invention which is delimited solely by the appended claims.

What is claimed is:

1. A clip driver for attaching a clip to sheets of paper or the like, said clip having a pair of opposing generally flat holding webs the front ends of which are resiliently pressed against each other to form opposing lips for clamping said sheets therebetween and at least one pair of opposing lugs, each projecting laterally from one of the side edges of each said holding web, said clip driver comprising: a casing; a guide way formed in said casing to extend longitudinally therethrough; an inlet for charging said clip into said guide way in such a manner that said lips of said clip are directed toward the front end of said guide way; an outlet provided in the front end of said guide way for delivering said clip; and clip opening means disposed on at least one side of said guide way near the front end of the latter and having opposite guide surfaces gradually diverging toward said outlet, said pair of lugs of said clip being adapted to make sliding engagement with said guide surfaces, respectively, to open said clip during the forward movement of said clip along said guide way, and wherein said clip opening means consists of a member shaped like a tuning fork having a flat rear portion and two inclined leg portions bifurcated from said flat rear portion, wherein at least said inclined leg portions are made from a resilient member so as to be deflected toward and away from each other and said tuning-fork-like member is fixed to said casing at said flat rear portion.

2. A clip driver as set forth in claim 1, further comprising a clip driving member slidable along said guide way for driving said clip in said guide way toward said outlet.

3. A clip driver as set forth in claim 2, further comprising a pair of guide grooves extending along opposing side walls defining said guide way, said clip driving member having a pair of lugs projecting laterally outwardly from the opposing sides therof and adapted for being slidably received by said guide grooves.

4. A clip driver as set forth in claim 3, wherein said clip driving member is further provided with a pair of resilient tabs extending forwardly along and connected at their rear ends to the opposing sides thereof and having their front ends adapted to be in sliding engagement with the upper surfaces of the side walls defining said guide way for resiliently urging the front end of said clip driving member upwardly.

5. A clip driver as set forth in claim 1, wherein said guide way extends through the entire length of said casing to form said inlet at the rear end of said guide way and a rear cover is provided at the rear end of said casing for movement between the positions for closing and opening said inlet.

6. A clip driver as set forth in claim 1, further comprising a permanent magnet embedded in the bottom of said guide way for holding said clip stationary before said clip is moved to bring said lugs thereof into engagement with said guide surfaces of said clip opening means.

7. A clip driver as set forth in claim 6, further comprising a transverse stopper groove formed in the bottom of said guide way behind said magnet for engagement with the rear edge of said holding webs of said clip to stop and retain the latter against backward movement along said guide way.

8. A clip driver as set forth in claim 1, further comprising a transverse stopper groove formed in the bottom of said guide way for engagement with rear edge of said holding webs of said clip moved to a position near said clip opening means to retain said clip against backward movement along said guide way.

9. A clip driver as set forth in claim 1, wherein said casing has a sloped upper surface and said guide way extends along said upper surface with said outlet located at the lower end thereof.

10. A clip driver as set forth in claim 9, further comprising a clip driving member slidable along said guide way for driving said clip toward said outlet and a hand lever pivotally mounted on said casing and operatively connected to said clip driving member.

11. A clip driver as set forth in claim 10, further comprising stop means for limiting the pivotal movement of said lever to such a range as to drive said clip by said clip driving member to a position where said lugs of said clip just clear said clip opening means, and means for urging said lever to be kept apart from said stop means.

12. A clip driver as set forth in claim 1, wherein said clip driving member is provided at the rear end thereof with a pair of lateral lugs and has a front end adapted to engage with the rear end of said clip in said guide way, further comprising guide grooves extending in parallel with and above said guide way for slidably and pivotally receiving said lateral lugs of said clip driving member, and a link pivotally connected at its ends to the front portion of said clip driving member and said hand lever.

13. A clip driver as set forth in claim 1, further comprising a guide groove extending in alignment with said flat rear portion of said tuning-fork-like member and adapted for slidably receiving said lugs of said clip.

14. A clip driver as set forth in claim 1, further comprising means provided at said outlet for positioning the edges of the sheets between said lips of said clip moved forward to such a position that said lugs of said clip clear said guide surfaces of said clip opening means so that said lips are springed back toward each other due to resiliency to clip the sheets therebetween.

15. A clip driver for attaching a clip to sheets of paper or the like, said clip having a pair of opposing generally flat holding webs the front ends of which are resiliently pressed against each other to form lips for clamping said sheets therebetween and two pairs of opposing lugs symmetrically disposed with respect to said holding webs to project laterally from the both side edges of said holding webs, respectively; said clip driver comprising; an elongate casing; a guide way formed through the entire length of said casing and defined by a top wall, side walls and a bottom wall; an inlet formed between the front and rear ends of said casing through said top wall to communicate with said guide way and having a cross-section conforming with the outline of said clip for charging said clip into said guide way in such a manner that said lips of said clip are directed toward the front end of said guide way; an outlet provided in the front end of said guide way for delivering said clip; clip opening members disposed on said side walls of said guide way near the front end of the latter in opposite relationship with each other with a distance therebetween corresponding to the width of said holding web of said clip, said each pair of lugs of said clip being adapted to make sliding engagement with said each opening member to open said clip during the forward movement of said clip along said guide way, said each opening member having a form like a tuning fork having a flat rear portion substantially in parallel with said top and bottom walls, opposing inclined portions bifurcated from the front end of said flat rear portion and opposing flat front portions extending forwardly from the front ends of said respective inclined portions substantially in parallel with each other and said top and bottom walls, at least said opposing flat front portions and said opposing inclined portions of said each opening member being made from a resilient member so as to be deflected toward and away from each other; slots formed at the front end of said casing through said side walls for receiving and positioning the edge of said sheets, said each slot extending in parallel with said top and bottom walls at least to a position between said flat front portions of said each opening member; and a clip driving member inserted into said guide way from the rear end thereof for slidable reciprocation along said guide way.

16. A clip driver for attaching a clip to sheets of paper or the like, said clip having a pair of opposing generally flat holding webs the front ends of which are resiliently pressed against each other to form lips for clamping said sheets therebetween and two pairs of opposing lugs symmetrically disposed with respect to said holding webs to project laterally from the both side edges of said holding webs, respectively; said clip driver comprising; a casing; a guide way defined by side walls and a bottom wall formed through the entire length of said casing; a pair of parallel ridges formed longitudinally on the inner surface of the rear half portion of said each side wall to define therebetween a groove for slidably receiving each one of said pairs of lugs of said clip; a slot formed through the front half portion of said each side wall, said slot having a flat rear end portion alignment with said groove and a flared portion extending forwardly from said rear end portion and opened at its front end; a clip opening member made of resilient material and disposed within said slot so as to have an inner edge substantially flush with the inner edges of said ridges, said clip opening member having a flat rear end portion securely fitted into said flat rear end portion of said slot and opposing inclined leg portions bifurcated from the front end of said flat end portion of said clip opening member and adapted to be deflected toward and away from each other.

17. A clip driver as set forth in claim 16, wherein said inclined leg portions of said clip opening member extend to the open end of said slot, transverse webs are provided to interconnect the front ends of said upper inclined portions and the front ends of said lower inclined portions, respectively, of said opposing clip opening members, the inner edges of said inclined leg portions are notched in the front portions thereof adjacent to said transverse webs.

18. A clip driver as set forth in claim 16 or 17, wherein said clip opening member is formed by bending a resilient plate-like member at its intermediate portion.

19. A clip driver for attaching a clip to sheets of paper or the like, said clip having a pair of opposing generally flat holding webs the front ends of which are resiliently pressed against each other to form lips for clamping said sheets therebetween and two pairs of opposing lugs symmetrically disposed with respect to said holding webs to project laterally from the both side edges of said holding webs, respectively; said clip driver comprising; an elongate casing; a guide way defined by side walls and a bottom wall formed through the entire length of said casing; first guide grooves formed on the inner surfaces of said side walls to extend from the rear end toward the front end thereof for slidably receiving said respective pairs of lugs of said clip; recesses formed on the inner surfaces of said side walls near the front ends thereof to communicate with the front ends of said first guide grooves and having a configuration diverging toward the front end of said casing; tuning-fork-like clip opening members disposed in said recesses and having inner edges substantially flush with the inner surfaces of said side walls, said each clip opening member having a flat rear portion extending in alignment with said first guide groove and firmly fixed to said casing and two resilient inclined leg portions bifurcated from the front end of said flat rear portion and adapted to be deflected toward and away from each other; second guide grooves formed on the inner surfaces of said side walls to extend in parallel with and above said first guide grooves; a clip driving member having a pair of lugs projecting laterally from the opposing sides of the rear portion thereof and adapted to be in slidable engagement with said second guide grooves for permitting said clip driving member to move along said guide way over said clip accommodated in said guide way and to swing to lower the front end of said clip driving member into engagement with rear end of said clip; and slots formed through said side walls to be opened at the front ends thereof and extend rearwardly to a position between said two inclined leg portions of said clip opening member for receiving the edges of the sheets to be clipped by said clip.

20. A clip driver as set forth in claim 19, wherein said clip driving member is further provided with a pair of resilient tabs extending forwardly along and connected at their rear ends to the opposing sides thereof and having their front ends adapted to be in sliding engagement with the upper surfaces of said side walls for resiliently holding the front end of said clip driving member above said clip accommodated in said guide groove.

21. A clip driver as set forth in claim 19 or 20, further comprising a permanent magnet embedded in said bottom wall for holding stationary said clip moved to a position in said guide way near said clip opening member and a transverse stopper groove formed on said bottom wall behind said magnet for engagement with the rear edge of said holding webs of said clip for retaining the latter against backward movement along said guide way.

22. A clip driver as set forth in claim 19 or 20, further comprising a rear cover provided at the rear end of said casing for movement between the positions for closing and opening the rear end of said guide way.

23. A clip driver for attaching a clip to sheets of paper or the like, said clip having a pair of opposing generally flat holding webs the front ends of which are resiliently pressed against each other to form lips for clamping said sheets therebetween and two pairs of opposing lugs symmetrically disposed with respect to said holding webs to project laterally from the both side edges of said holding webs, respectively; said clip driver comprising; a casing having a sloped upper surface; a sloped guide way formed along the entire length of said upper surface of said casing and defined by opposing side walls and a bottom wall; first guide grooves formed on the inner surfaces of said side walls to extend from the upper rear end toward the lower front end thereof for slidably receiving said respective pairs of lugs of said clip; recesses formed on the inner surfaces of said side walls near the front ends thereof to communicate with the front ends of said first guide grooves and having a configuration diverging toward the front end of said casing; tuning-fork-like clip opening members disposed in said recesses and having inner edges substantially flush with the inner surfaces of said side walls, said each clip opening member having a flat rear portion extending in alignment with said first guide groove and firmly fixed to said casing and two resilient inclined leg portions bifurcated from the front end of said flat rear portion; second guide grooves formed on the inner surfaces of the front portions of said side walls to extend in parallel with and above said first guide grooves; a clip driving member having a pair of lugs projecting laterally from the opposing sides of the rear portion thereof for slidable engagement with said second guide grooves for permitting said clip driving member to move along said clip guide way over said clip accommodated in said guide way and to swing to bring the front end thereof into engagement with the rear end of said clip; a hand lever pivotally mounted on said casing; a link pivotally connected at its ends to said hand lever and the front portion of said clip driving member; stop means for limiting the forward movement of said clip driving member to such a position that said lugs of said clip drived by said clip driving member just clear said clip opening members; means for urging said hand lever to keep said clip driving member apart rearwardly from said position; and slots formed through said side walls to be opened at the front ends thereof and extend rearwardly to a position between said two inclined leg portions of said clip opening member for receiving the edges of the sheets to be clipped by said clip.

* * * * *